Dec. 29, 1964 F. F. LADD, JR 3,163,829
SHORTPROOF EMITTER FOLLOWER PROTECTIVE CIRCUIT
Filed May 10, 1962
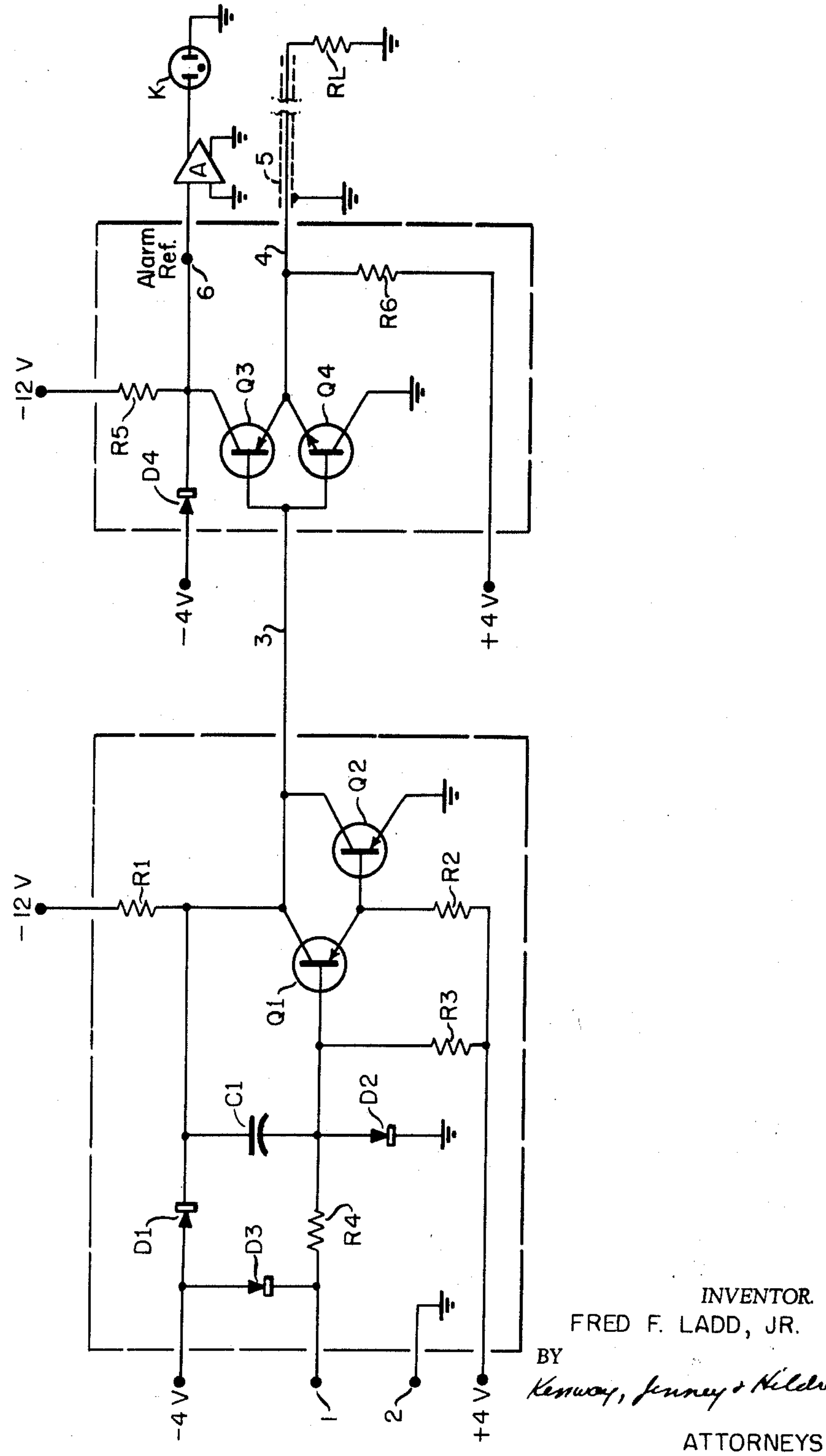
INVENTOR.
FRED F. LADD, JR.
BY
Kenway, Jenney & Hildreth
ATTORNEYS 3,163,829
Patented Dec. 29, 1964

3,163,829
SHORTPROOF EMITTER FOLLOWER PROTECTIVE CIRCUIT

Frederick F. Ladd, Jr., Newbury, Mass., assignor to Anelex Corporation, Boston, Mass., a corporation of New Hampshire Filed May 10, 1962, Ser. No. 193,801
7 Claims. (Cl. 330—24)

My invention relates to transistor circuits, and particularly to a novel short proof emitter follower circuit.

An emitter follower is conventionally used in many applications requiring a low impedance generator for a line, and particularly as the output stage of a circuit or system which is to be connected to another circuit or system by a cable. While otherwise highly satisfactory for this purpose, the emitter follower circuits employed prior to my invention have, so far as I am aware, been universally subject to damage and destruction by accidental grounding of their emitter output terminals. Specifically, if the emitter terminal of an emitter follower is accidentally grounded by brushing a connector cable against the case of the equipment, or by accidentally grounding the emitter with a test instrument lead, the transistor is usually destroyed. Frequently, a number of printed circuit cards on which emitter follower circuits are mounted have been successively inserted in place, damaged, and removed, before the person servicing the equipment became aware of the source of the trouble. It is the primary object of my invention to eliminate damage to emitter followers due to accidental shorting.

Briefly, the objects of my invention are carried out, in accordance with a preferred embodiment thereof, by providing a novel emitter follower circuit in which a pair of complementary transistors are interconnected, in a manner to be described, with their emitters connected together, to supply current through one of them and through a first resistor to a desired circuit having a selected load impedance. The first resistor is selected to have an impedance substantially less than that of the design load impedance, but sufficiently large to act as a load resistor which protects the conducting transistor upon accidental shorting of the emitter to the reference terminal or ground. Basically, the emitter follower of my invention is, in effect, transformed into the grounded emitter configuration in response to an accidental short. As will appear, by this arrangement it is possible to avoid any damage resulting from accidental grounding of the emitter.

My invention will be best understood by reference to the accompanying drawing, together with the following detailed description, of a preferred embodiment thereof.

In the drawing, the sole figure comprises a schematic wiring diagram of an emitter follower circuit of my invention, shown connected between a typical input circuit and a load represented by a resistor.

Referring now to the drawing, in the block at the left I have shown an amplifier comprising a Miller integrator modified to generate a linear ramp voltage, which may be used to supply the emitter follower of my invention. As will appear to those skilled in the art, any other suitable signal source may be employed, but the amplifier I have shown is typical and will serve to illustrate the use of my invention. The supply amplifier comprises a pair of transistors Q1 and Q2. The transistor Q1 has its collector connected to the collector of the transistor Q2, and both are returned to a suitable source of negative voltage, here shown as a −12 volt source, through a common load resistor R1. The collectors are clamped by a diode D1, which is returned to a lower negative voltage source, here shown as a −4 volt source, to limit the excursion of the collectors of the transistors in the negative direction.

The emitter of the transistor Q2 is connected to ground, and the emitter of the transistor Q1 is connected to the base of the transistor Q2. The junction of the last two elements is returned to a suitable bias source, here shown as a positive 4 volt source, through a resistor R2.

The base of the transistor Q1 is returned to the same bias source through a resistor R3. An operating signal may be supplied to the amplifier across a pair of terminals 1 and 2, terminal 2 being grounded as shown. Terminal 1 is connected to the base of the transistor Q1 through a resistor R4. The base of transistor Q1 is clamped to ground or below by a diode D2. The input terminal 1 is limited in its negative excursion by a diode D3 connected between terminal 1 and the −4 volt source. A conventional integrating capacitor C1 is connected between the collector of the transistor Q1 and its base.

As will be apparent to those skilled in the art, the operation of the amplifier upon the application of an input signal to the terminals 1 and 2 is as follows: If the input signal is positive-going, between extreme values of ground and −4 volts, the normal forward bias of the emitter of the transistor Q1 will be reduced, limiting conduction in the transistor and causing its emitter to rise in potential, while its collector becomes more negative. As the emitter of the transistor Q1 goes upward in potential, the base of the transistor Q2 will tend to be reverse-biased, limiting conduction in the transistor Q2. The potential at the collectors of the transistors Q1 and Q2 will then be more negative, causing a negative-going signal to be applied over the lead 3 to the emitter follower of my invention. If the input signal between the terminal 1 and the grounded terminal 2 is negative-going, the opposite action will take place, and conduction of transistors Q1 and Q2 will be increased, causing the lead 3 to become more positive.

Considering now the emitter follower of my invention, it comprises a pair of complementary transistors Q3 and Q4. As here shown, the transistor Q3 comprises a PNP transistor, and the transistor Q4 is an NPN type. However, it will be apparent to those skilled in the art that these types may be interchanged, by proper change of polarities, if so desired.

The bases of the transistors Q3 and Q4 are connected together, and are connected to the output lead 3 of the supply amplifier. The emitters of the transistors are also connected together, and are connected to an output lead 4. As schematically indicated, the output lead 4 may be connected across a load having a load impedance indicated as a resistor RL, through a cable provided with a grounded shield 5.

The collector of the transistor Q4 is returned to ground. The collector of the transistor Q3 is returned to a suitable negative voltage source, here shown as a −12 volt source, through a suitable load resistor R5, which is especially selected, in a manner to be described, to attain the objects of my invention. The excursions of the collector of the transistor Q3 may be limited in a negative direction by a diode D4 connected between the collector and a negative source, here shown as a −4 volt source.

As indicated, the voltage at the terminal 6, which is connected to the collector of the transistor Q3, may be employed, if so desired, as an alarm signal to indicate grounding of the emitters of the transistors Q3 and Q4. For this purpose, I have shown a conventional isolating amplifier A having its input terminals connected between the collector of the transistor Q3 and ground, and its output terminal connected across an indicator K, which may comprise a neon glow tube. The circuit constants of the amplifier A may be selected to cause the glow tube K to discharge in response to the increase in voltage at the collector of the transistor Q3 when the emitter is grounded, indicating visually that a circuit failure has occurred.

The collector voltage change may also be used to actuate an electronic switch, as to select an alternate communication line when the line in use becomes grounded. Since the collector voltage rise will occur within fractions of a microsecond after the emitter is grounded, switching may be accomplished rapidly enough to save most of the information that would otherwise be lost. The alarm indication, as well as the emergency switching function, which is provided may be especially valuable in systems in which a short may occur at any point in a long transmission line, or at a remote location.

Bias potential is supplied to the emitters of the transistors Q3 and Q4 by a suitable biasing resistor R6, which is returned to a suitable source of positive voltage, here shown as a positive 4 volt source. Desirably, the resistor R6 is selected to be relatively large with respect to the resistor R5, and the resistor R5 is selected to be relatively small with respect to the load resistance RL. In a typical embodiment of my invention, the values for the components of the circuit described so far were as follows:

| Resistors | Value |
|---|---|
| R1 | 1.2K ohms, ½ w., 5 percent. |
| R2 | 2.2K ohms, ½ w., 5 percent. |
| R3 | 4.64K ohms, ½ w., 1 percent. |
| R4 | 1.96K ohms, 1 w., 5 percent. |
| R5 | 270 ohms, 1 w., 5 percent. |
| R6 | 2.2K ohms, ½ w., 5 percent. |
| RL | 500 ohms. |
| Capacitor C1 | 750 micromicrofarads, 2 percent. |

The diodes D1, D2 and D3 were type IN276, and the diode D4 was a IN645. The transistors Q1, Q2 and Q3 were 2N404's and the transistor Q4 was a 2NI605.

In normal operation, the emitter follower circuit of my invention performs the same function as a conventional emitter follower. In general, the transistors Q3 and Q4 operate in push-pull fashion to control the voltage on the output lead 4 in accordance with the voltage of the input lead 3. Thus, as long as the lead 4 is above the lead 3 in potential, the emitter of the transistor Q4 is reverse-biased, and is cut off. The emitter of the transistor Q3 is forward-biased with respect to its base, and load current flows through the collector of this transistor and the resistor R5, and thence through the load resistance RL. Since the resistor R5 is chosen to be relatively small with respect to the load resistor RL, it has little or no regulating effect on the voltage output. Should the voltage on the output lead 4 tend to go below that of the input lead 3, the transistor Q4 will be forward-biased and will conduct, restoring the potential to that of the input lead 3.

Next, assume that the output lead 4 is inadvertently grounded, as by brushing the ends of the conductor comprising the shield 5 against the lead 4 in connecting the cable to the load impedance. The transistor Q4 is now effectively shunted out of the circuit, with both its emitter and its collector at ground potential. The transistor Q3 now appears as a grounded emitter collector follower, with R5 as the load resistor. I have found it is quite possible to select the value of the resistor R5 to be small with respect to typical load impedances, and yet amply large enough to protect the transistor Q3 against damage in the event that its emitter is grounded. Accordingly, in the circuit of my invention, the annoying and expensive difficulties which formerly arose in the use of emitter followers have been effectively prevented.

Within the broader aspects of my invention, the transistor Q4 may be omitted. This may be accomplished by simply disconnecting the transistor Q4 from the circuit shown. With the transistor Q4 removed, the transistor Q3 will behave as a conventional single transistor emitter follower under normal conditions, but will be protected in the manner described above in the event that its emitter becomes grounded.

While I have described one embodiment of my invention in detail, many changes and variations will be apparent to those skilled in the art after reading my description, and such may obviously be made without departing from the scope of my invention.

Having thus described my invention, what I claim is:

1. A short proof emitter follower, comprising a pair of complementary transistors having their emitters and bases, respectively, connected together, a source of voltage having a first terminal at a first potential, a second terminal at a second potential, and a third terminal at an intermediate potential, the collector of a first of said transistors being connected to said first terminal, and the collector of the second of said transistors being connected to said second terminal through a first resistor having a first value, a diode connected between the collector of said second transistor and said third terminal, said diode being poled to permit the flow of current from said third terminal to said first terminal through said first resistor, the emitters of the transistors being returned to a source of biasing potential through a biasing resistor which is large with respect to the first resistor, and the emitters of the transistors being returned through a load impedance to the second terminal, the first resistor being relatively small with respect to the load impedance and sufficiently large to prevent damage to the second transistor if the load impedance is shunted.

2. In combination, a pair of complementary transistors having their emitters connected together and their bases connected together, a source of voltage having a first terminal, a second terminal and a third terminal at first, second and third potentials, respectively, said third potential being intermediate said first and second potentials, a resistor, means connecting the collector of a first of said transistors to said first terminal through said first resistor, the collector of the other transistor being connected to the second terminal, a diode connected between said third terminal and the collector of said first transistor and poled to permit the flow of current from said first terminal to said third terminal through said resistor, and a load impedance connected between the emitter of said transistors and said second terminal, said resistor being sufficiently large to protect said first transistor from damage when its emitter is connected to said second terminal.

3. In combination, a signal voltage source having an output terminal and a reference terminal, a load voltage source having a first terminal connected to said reference terminal, a second terminal at a first potential with respect to said first terminal, and a third terminal at a potential intermediate the potentials of the first and second terminals, a pair of complementary transistors each having an emitter, a collector and a base, said emitters being connected together, a load impedance connected between the emitters and said reference terminal, means connecting said output terminal to the bases of said transistors, a resistor connected between said second terminal and the collector of a first of said transistors, clamping means connected between the collector of said first transistor and said third terminal to limit the excursions of the collector to a voltage range bounded by the potentials of said first and said third terminals, means connecting the collector of the second transistor to said reference terminal, and means for biasing said emitters with respect to said bases to cause the emitter of said first transistor to follow the potential of said output terminal within said range, the value of said resistor being sufficient to prevent damage to said first transistor if its emitter is connected to said reference terminal.

4. An emitter follower, comprising a pair of complementary transistors each having an emitter, a collector and a base, the emitters being connected together, the bases being connected together, and the collector of a first of said transistors being connected to a reference terminal, a source of voltage having a first terminal connected to said reference terminal, a second terminal at a first potential with respect to said reference terminal and a third terminal at a second potential intermediate the potentials of said first and said reference terminals, a resistor connected between the collector of the second transistor and the second terminal of the voltage source, a predetermined load impedance connected between said emitter and said reference terminal, said resistor being large enough to protect the transistor if its emitter is connected to the reference terminal and small with respect to said load impedance, a diode connected between the collector of said second transistor and the third terminal of said source and poled to limit the excursions of the collector of said second transistor to a range bounded by the potentials of the third and reference terminals and means for biasing the emitter of the second transistor forwardly with respect to its base.

5. The emitter follower of claim 4, further comprising means responsive to the potential of the collector of said second transistor for producing an output signal when the emitters of said transistors are connected to the reference terminal.

6. In combination, first and second complementary transistors each having an emitter, a collector, and a base, said emitters being connected together and said bases being connected together, means for applying a signal voltage varying between zero and a first voltage between said bases and the collector of said first transistor, means for biasing the emitter of said second transistor forwardly with respect to its base, a load impedance connected between said emitters and the collector of said first transistor, a resistor having a first terminal and a second terminal, the first terminal of said resistor being connected to the collector of said second transistor, means for applying a second voltage greater than said first voltage between the second terminal of said resistor and the collector of said first transistor, a diode having a first terminal and a second terminal, the first terminal of said diode being connected to the collector of said second transistor, and means for applying a voltage equal to said first voltage between the second terminal of said diode and the collector of said first transistor, said diode being poled to permit the flow of current between its second terminal and the second terminal of said resistor, and the conductances of said load impedance and said resistor being selected so that the magnitude of current flowing in said load impedance in response to a voltage across it equal to said first voltage is smaller than the current through said resistor which would cause a voltage across said resistor equal to the difference between said second voltage and said first voltage.

7. The apparatus of claim 6, further comprising means responsive to the voltage at the collector of said second transistor for producing an output signal when the emitters of said transistors are connected to the collector of said first transistor.

References Cited by the Examiner

UNITED STATES PATENTS

| | | | |
|---|---|---|---|
| 2,918,627 | 12/59 | Denz | 330—13 |
| 2,962,665 | 11/60 | Greatbatch | 330—32 |

ROY LAKE, *Primary Examiner.*

NATHAN KAUFMAN, *Examiner.*